Patented Oct. 31, 1944

2,361,566

UNITED STATES PATENT OFFICE 2,361,566

AZO PIGMENTS

William B. Reynolds, Chicago, Ill., assignor to Interchemical Corporation, New York, N. Y., a corporation of Ohio No Drawing. Application February 25, 1942, Serial No. 432,241

3 Claims. (Cl. 260—176)

This invention relates to new insoluble orange-yellow dyestuffs, or pigments, which are obtainable by coupling tetrazotized 3,3'-dichlorbenzidine with certain aceto-acetarylamides, and which are especially useful in printing inks and printing emulsions.

Many insoluble dyestuffs, or pigments, have been made heretofore by coupling various azotized benzidines with aceto-acetarylamides, and these compounds are generally referred to as the "benzidine yellows or oranges" because of their characteristic yellow to orange colors. Although the known compounds are often used in various printing and dyeing operations in preference to other types of yellow dyestuffs (such as the Hansa yellows) because of their relatively superior solvent fastness and greater tinctorial strength, they are not used where it is important to maintain the particular shade of color over long periods of time in exposed places because of their notably poor lightfastness.

This invention provides two deep yellow or orange-yellow pigments of the class of benzidine yellows which are distinguished from known pigments of the same class by their superior lightfastness and, to a lesser extent, their high coloring strength or tinctorial power.

The two pigments of this invention may be designated as the compounds resulting from (1) the coupling of tetrazotized 3,3'-dichlorbenzidine with aceto-acet-2-methoxy-5-methyl anilide, having the following formula:

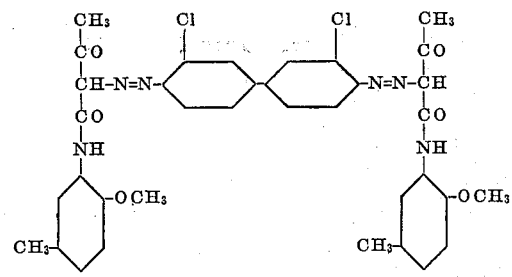

and, (2) the coupling of tetrazotized 3,3'-dichlorbenzidine with aceto-acet-2,5-dimethoxy anilide, having the following formula:

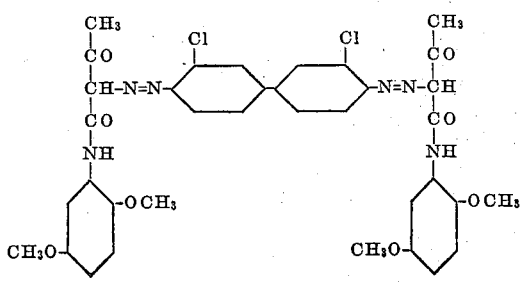

Obviously, these two compounds may be expressed by the generic formula

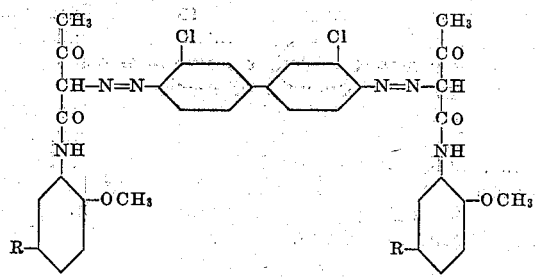

where R is methyl or methoxy.

The two pigments of this invention may be made in the usual manner from 3,3'-dichlorbenzidine and the respective aceto-acetic arylide, and if the latter is not available it, in turn, may be made from aceto-acetic ester and the corresponding amine base. Other well known chemical reactions may be employed if desired. The following examples are, however, illustrations of one specific method of preparing the above two pigments.

Example 1

2.2 mols of ethyl aceto-acetate previously dried over anhydrous sodium sulfate and soda ash, and 325 parts by weight of anhydrous xylene were placed in a flask and heated to gentle reflux. Then 2 mols of 2-methoxy-5-methyl aniline were added to the xylene solution of the aceto-acetic ester over a period of about 45 minutes. The alcohol formed in the reaction was removed by distillation. By maintaining sufficient reflux the alcohol may be removed quantitatively as the reaction proceeds. After all of the amine was added the heating was continued for 15 to 20 minutes or until the theoretical amount of alcohol had been distilled from the reaction mixture. On completion of the reaction the mixture was cooled and poured into 70 parts of 10 N hydrochloric acid containing 300 parts of ice, whereupon the aceto-acet-2-methoxy-5-methyl anilide was precipitated. After stirring for 15 minutes the anilide was separated by filtration and the cake pressed to remove as much as possible of the xylene and excess aceto-acetic ester. The crude anilide was then dissolved in 2500 parts of water containing 2 mols of caustic soda, clarified with 5 parts each of activated silica and activated carbon, and filtered. The filtrate was iced to about 5° C. and the anilide precipitated with hydrochloric acid, filtered, washed acid-free to Congo red and dried in a low temperature oven.

Example 2

The tetrazo compound was made in the following manner.

One mol of 3,3'-dichlorbenzidine was stirred into 2000 parts by weight of water and 5 mols of 10 N hydrochloric acid were added. The mixture was stirred for 2 hours and 5000 parts of ice were added, along with 20,000 parts of water. The resulting slurry was stirred until the temperature of the liquid dropped below 5° C. Then 2 mols of sodium nitrite, dissolved in 2000 parts of water, were added rapidly to the slurry. After stirring for 45 minutes, while maintaining an excess of sodium nitrite, the tetrazo solution was clarified with activated carbon and silica.

A coupling slurry of the anilide of Example 1 was prepared by dissolving 2.06 mols of the anilide in 7000 parts of water containing 2.1 mols of caustic soda and 1000 parts of ice. Then 6 mols of sodium acetate were added and the mixture stirred until complete solution was obtained. After clarifying, 2.1 mols of 2 N hydrochloric acid were slowly added, yielding a white slurry which was slightly acid to litmus.

The tetrazo compound was added to the coupling slurry over a period of about one hour, and the resulting pigment slurry was stirred for 4 hours to insure a light masstone. At the end of this time the pigment was filtered, washed free of chloride and dried.

Example 3

By substituting 2,5-dimethoxy aniline for the 2-methoxy-5-methyl aniline of Example 1, the aceto-acet-2,5-dimethoxy anilide was prepared, and this substance was coupled with the tetrazotized 3,3'-dichlorbenzidine and the resulting pigment isolated, as described in Example 2.

These two deep yellow or orange-yellow pigments were compared with two well known products of similar chemical structure, namely, the dyestuffs resulting from coupling tetrazotized 3,3'-dichlorbenzidine with aceto-acetanilide and aceto-acet-o-toluidide, respectively. Both of these products have found wide commercial application. Both pigments of this invention proved far superior in lightfastness to either of the above commercially known products. Also, the 2-methoxy-5-methyl anilide derivative showed a color strength of about 172%, and the 2,5-dimethoxy anilide derivative showed a color strength of about 153%, of that shown by the aceto-acetanilide product used as standard. Both of these new compounds are sufficiently solvent-fast and non-bleeding in oils to render them particularly suited for use as pigments in color printing inks, textile printing emulsions and the like.

I claim:

1. A compound having the formula

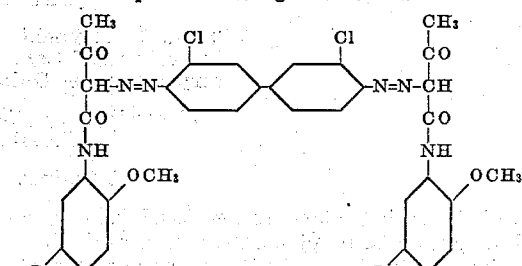

where R is selected from the group consisting of methyl and methoxy.

2. A compound having the formula

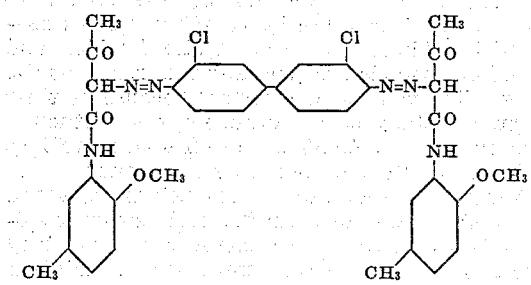

3. A compound having the formula

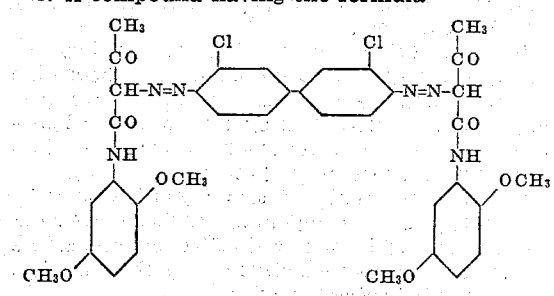

WILLIAM B. REYNOLDS.